United States Patent
Steel et al.

(10) Patent No.: US 12,057,947 B1
(45) Date of Patent: Aug. 6, 2024

(54) APPLICATION OF ERROR DETECTING CODES IN A PROTOCOL-TRANSLATING INTERCONNECT CIRCUIT

(71) Applicant: Arm Limited, Cambridge (GB)

(72) Inventors: Sean Allan Steel, Temple, TX (US); David Yue Williams, Austin, TX (US); Premkishore Shivakumar, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/115,301

(22) Filed: Feb. 28, 2023

(51) Int. Cl.
*H04L 1/00* (2006.01)
*H04L 1/24* (2006.01)

(52) U.S. Cl.
CPC .................................... *H04L 1/245* (2013.01)

(58) Field of Classification Search
None
See application file for complete search history.

(56) References Cited

U.S. PATENT DOCUMENTS

| | | | | |
|---|---|---|---|---|
| 9,432,298 B1 * | 8/2016 | Smith | ............... | H04L 49/9057 |
| 11,630,773 B1 * | 4/2023 | Shatsky | ............... | G06F 12/0871 |
| | | | | 711/118 |
| 2003/0072275 A1 * | 4/2003 | Beering | ............. | H04B 7/18591 |
| | | | | 370/252 |
| 2003/0110344 A1 * | 6/2003 | Szczepanek | ........ | H04L 12/4625 |
| | | | | 709/200 |
| 2007/0276976 A1 * | 11/2007 | Gower | ................ | G06F 13/4247 |
| | | | | 710/305 |
| 2010/0005477 A1 * | 1/2010 | Bovet | ...................... | G06F 8/316 |
| | | | | 717/121 |
| 2013/0305066 A1 * | 11/2013 | Mullins | ................. | G06F 1/3203 |
| | | | | 713/310 |
| 2019/0108145 A1 * | 4/2019 | Raghava | ............. | G06F 13/1668 |
| 2019/0205244 A1 * | 7/2019 | Smith | ...................... | G06F 3/065 |
| 2019/0361770 A1 * | 11/2019 | Geng | .................. | G06F 11/1004 |
| 2019/0363829 A1 * | 11/2019 | Tune | .................... | G06F 13/4027 |

* cited by examiner

*Primary Examiner* — Mujtaba M Chaudry
(74) *Attorney, Agent, or Firm* — Leveque Intellectual Property Law, P.C.

(57) ABSTRACT

In a data processing network, error detection information (EDI) is generated for first data of a first communication protocol of a plurality of communication protocols, the EDI including an error detection code and an associated validity indicator for each field group in a set of field groups. The first data and the EDI are sent through a network interconnect circuit, where the first data is translated to second data of a second communication protocol. An error is detected in the second data received from the network interconnect circuit when a validity indicator for a field group is set in EDI received with the second data and an error detection code generated for second data in the field group does not match the error detection code associated with the field group in the received EDI.

20 Claims, 7 Drawing Sheets

APPLICATION OF ERROR DETECTING CODES IN A PROTOCOL-TRANSLATING INTERCONNECT CIRCUIT

BACKGROUND

Error detection using error detection codes is a technique to ensure reliable communication when information is transmitted. In particular, error detection codes can be added to detect when the information received does not match information that is sent. Generally, a first error detection code (EDC) is calculated from transmission data at a transmitter and sent with the data across a link to a receiver. A second EDC is computed at the receiver from the received data. If the first and second EDCs do not match, it is assumed that an error has occurred (in transmission of the data and/or the EDC). However, when a protocol translation takes place in the link, some of the data may not be sent to the receiver. In this case, the receiver cannot compute the second EDC. This problem is compounded when the sender does not know in which protocol the data will be received.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

DETAILED DESCRIPTION

The various apparatus and devices described herein provide mechanisms for error detection and correction in a protocol-translating interconnect circuit.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

The present disclosure provides a mechanism for using error detection and correction codes in a protocol translating interconnect circuit. The mechanism is described with respect to error detection codes (EDCs), but it is to be understood that, herein, the term "error detection code" is taken to include codes that can be used both to detect errors and to correct error, as well other codes that are only used to detect errors.

In accordance with an embodiment of the disclosure, the information to be sent is split into groups based on whether the information is sent and received by each protocol. Information that is sent via protocol "A" and is received by both protocols "A" and "B" would be in a separate group from information that is sent via protocol "A" and only received by protocol "A". Similarly, data that is sent via protocol "B" but not sent via protocol "A" would be in a different group from data that is sent from both "A" and "B". Each group is protected by a different EDC and is associated with a validity indicator. In the embodiments described below, the validity indicator is described as a validity bit that is set (asserted) to indicate that the EDC is valid and cleared (de-asserted) to indicate that it is not. However, it will be apparent to those of skill in the art that alternative validity indicators may be used without departing from the present disclosure. If the protocol can send the data in a group, it can determine the EDC for the group and set the corresponding validity bit for the group. Otherwise, when the EDC is not calculated or cannot be calculated, the validity bit is cleared. On the receiving side, the receiver only checks the EDC if the valid bit is set (i.e., if the EDC is valid) and that data in the group is received via the receiving protocol.

Embodiments of the disclosure include a method of transporting data in multiple fields through a network interconnect circuit of a data processing network. Error detection information (EDI) is generated for first data of a first communication protocol, the EDI includes an error detection code and an associated validity indicator for each field group in a set of field groups of multiple fields. The first data may be received from a node of the data processing network via a link in accordance with the first communication protocol. The error detecting code of the EDI may be an error correcting code or a parity bit, for example. The EDI and the first data are sent to the network interconnect circuit. The first data is translated to second data of a second communication protocol. The second data and the EDI are received from the network interconnect circuit and an error in second data in a field group is detected when a validity indicator for the field group is set in the EDI and an error detection code generated for second data in the field group does not match the error detection code associated with the field group in the EDI.

Error detection information (EDI) for the first data is generated for each field group in the set of field groups. When the field group is in the first communication protocol an error detection code is generated for first data in the field group and placed in the EDI for the first data, and a validity indicator associated with the error detection code is set in the EDI. The validity indicator shows the validity of the associated error detection code for first data in the field group. When the field group is not associated with the first communication protocol, a validity indicator associated with the field group is cleared in the EDI for the first data.

An error in second data in a field group may be detected in any field group in the set of field groups. When the validity indicator of the EDI is set and the second data includes data in the field group, an error detection code is generated for second data in the field group and compared with the error detection code of the EDI. An error in the second data in the field group is indicated when the generated error detection code does not match the error detection code of the second EDI. No error is indicated when either the validity indicator in the EDI is not set or the second data does not include all data in the field group.

The set of field groups may be determined such that each field group in the set of field groups is common to a subset of communication protocols. A subset of the set of field groups may be common to both the first communication protocol and the second communication protocol.

Data in a field group may be selected in accordance with values stored in a configuration data store of the data processing network.

The second data may be transmitted to a node of the data processing network via a link in accordance with the second communication protocol and a detected error may be signaled to the node.

Embodiments of the disclosure include identifying a set of field groups in fields transportable through a network interconnect circuit of a data processing network, such that each field group in the set of field groups is common to a subset of a communication protocols of a plurality of communication protocols. A first circuit is configured to generate error detection information (EDI) for the field groups in a first communication protocol, the EDI includes an error detection code for data in the field group and a validity indicator associated with the error detection code.

A second circuit is configured to determine if a validity indicator associated with data in a field group of a second communication protocol is set in the EDI. When the validity indicator is set, an error detection code is generated for data in the field group and compared with an error detection code associated with the data in the field group in the EDI. An error in the data in the field group is signaled when the generated error detection code does not match the error detection code associated with the data in the field group in the EDI.

The first circuit may be further configured to clear, in the EDI associated with data in the first subset, a validity indicator associated with any field group of the set of field groups that is not in the first communication protocol. The second circuit may be further configured to signal no error in data of a field group of the second communication protocol when the validity indicator associated with the field group is not set in the EDI associated with data in the second subset.

In embodiments of the disclosure, a data processing network includes a network interconnect circuit, a first circuit and a second circuit. The network interconnect circuit is configured to receive, at a first interface, first data in fields of a first communication protocol, transport data in a plurality of fields from the first interface to a second interface. The plurality of fields includes fields common to the first communication protocol and a second communication protocol. The network interconnect circuit is also configured to transport error detection information (EDI) from the first interface to the second interface and to output second data in fields of the second communication protocol at the second interface. The EDI may include, for a set of field groups of the plurality of fields, error detection codes for data in the field groups and a validity indicator associated with each error detection code indicating whether the error detection code is valid.

The first circuit is configured to generate error detection information (EDI) for first data in field groups of the first communication protocol while the second circuit is configured to detect errors in the second data using EDI for second data in field groups of the second communication protocol.

The first circuit generates EDI for each field group of the set of field groups. When a field group is in the first communication protocol an error detection code is generated for first data in the field group and placed in the EDI for the first data and a validity indicator associated with the error detection code is set in the EDI for the first data. The validity indicator shows the validity of the associated error detection code for data in the field group. When the field group is not associated with the first communication protocol, the validity indicator is cleared.

The data processing network may also include a number of configuration data stores, such as registers for example, programmed to specify field groups of the set of field groups.

The data processing network may include a request node either coupled to the first interface circuit via the first circuit and configured to send data transaction requests in accordance with the first communication protocol or coupled to the second interface circuit via the second circuit and configured to receive data transaction responses in accordance with the second communication protocol.

The data processing network may include a subordinate node either coupled to the first interface circuit via the first circuit and configured to send data transaction responses in accordance with the first communication protocol or coupled to the second interface circuit via the second circuit and configured to receive data transaction requests in accordance with the second communication protocol.

Figure 1:
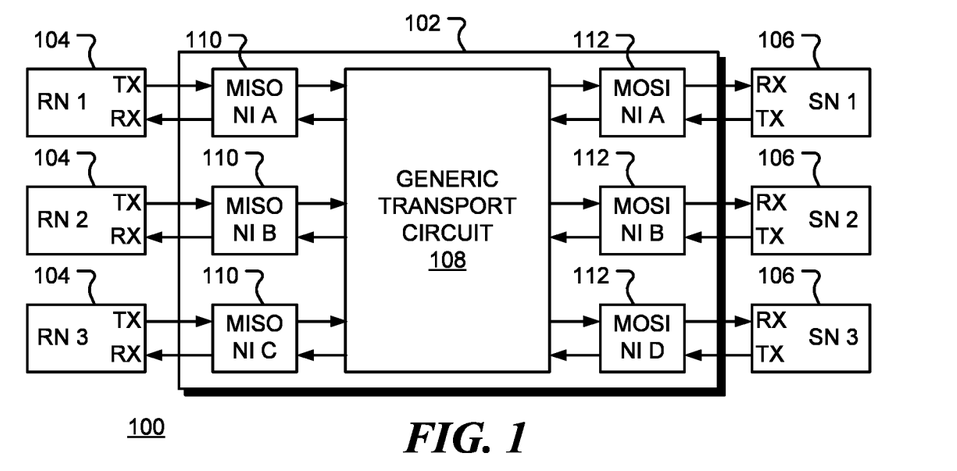
FIG. 1 is a block diagram of a data processing network, in accordance with various representative embodiments.

FIG. 1 is a block diagram of a data processing network 100, in accordance with various representative embodiments. Data processing network 100 includes network interconnect circuit 102 that links request nodes 104 (nodes that request data transactions) to subordinate nodes 106 (nodes that service the requested data transactions). A node may be capable of data transmission (TX), data reception (RX), or both transmission and reception. In the embodiment shown, network interconnect circuit 102 includes a generic transport circuit 108. This may have any topology, such as a mesh topology for example. Request node (RN) 104 is a master node that couples to the generic transport circuit 108 via a network interface (NI) 110. Generally, network interface 110 is a master-in, subordinate out (MISO) interface that receives information from a RN and outputs information received (via generic transport circuit 108) from subordinate nodes (SNs). The link between MISO NI 110 and a request node follows a communication protocol that specifies which data fields are to be sent and/or received. In the simplified example shown in FIG. 1, network interconnect circuit 102 has MISO interfaces using three different communication protocols, designated as "A", "B", and "C" in the figure. The MISO interfaces translate between the RN protocol and the generic protocol of the transport circuit.

Similarly, a subordinate node (SN) 106 couples to generic transport circuit 108 via network interface (NI) 112. Generally, network interface 112 is a master-out, subordinate-in (MOSI) interface the receives information from an SN and outputs information (from an RN) to the SN. In the simplified example shown in FIG. 1, network interconnect circuit 102 has MOSI interfaces using three different communication protocols, designated as "A", "B", and "D" in the figure. The MOSI interfaces translate between the SN protocols and the generic protocol of the transport circuit. Note that a protocol used by a MISO interface may not be used by any MOSI interface and vice versa.

Thus, a request node that uses a first communication protocol may transmit information to subordinate nodes that use different protocols to interface with the network interconnect circuit, and a subordinate node may respond the requests from request nodes that use different protocols.

Data processing network 100 may be implemented on a single chip or on multiple chips.

Figure 2:
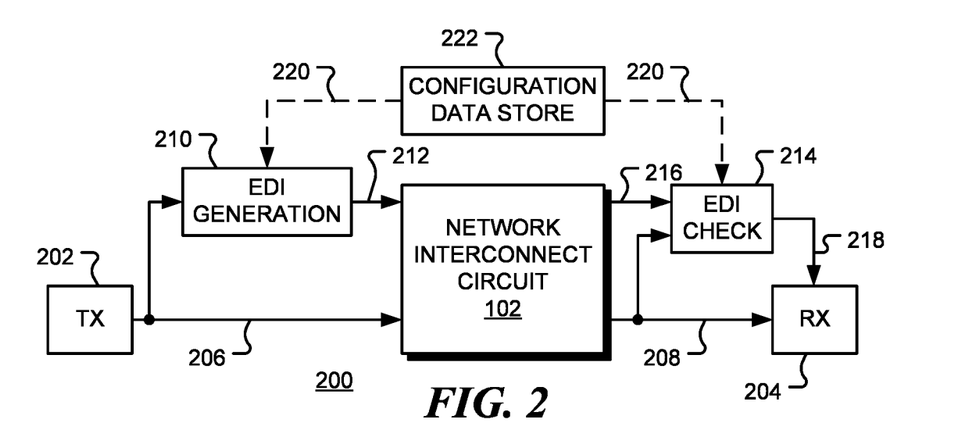
FIG. 2 is a block diagram of a protected data link between a transmitter and receiver using a protocol translating interconnect circuit, in accordance with various representative embodiments.

FIG. 2 is a block diagram of a protected data link 200 between a transmitter (TX) 202 and receiver (RX) 204 using a protocol translating interconnect circuit, in accordance with various representative embodiments. Data 206 is transmitted from TX 202 using a first communication protocol and corresponding (but not necessarily the same) data 208 is received by RX 204 using a second communication protocol. Link 200 includes network interconnect circuit 102 that is configured to connect to request and subordinate nodes using two or more specified communication protocols. In network interconnect circuit 102, data is transported in multiple data fields. In accordance with an aspect of the present disclosure, at least some fields are logically arranged as a set of field groups. Each field group is common to a subset of communication protocols of the specified communication protocols. Protected data link 200 includes first circuit 210 configured to receive data in a first subset of the set of field groups. The first subset of field groups associated with the first communication protocol used by transmitter 202. First circuit 210 generates error detection information (EDI) 212 for the set of field groups, including error detection codes and associated validity bits. An error detection code is generated for each field group of the first subset of field groups and a validity bit is set in the EDI for each error detection code. For any field group of the set of field groups not in the first subset of field groups, the validity bit in the EDI associated with the error detection code is clear. Both the data and the generated EDI are sent to network interconnect circuit 102.

Second circuit 214 checks data 208 and EDI information 216 received from network interconnect circuit 102. Data 208 received from the network interconnect circuit includes data in a second subset of the set of field groups, the second subset associated with the second communication protocol used by receiver 204. For each field group of the second subset of field groups, second circuit 214 first determines if a validity bit associated with the field group is set in the received EDI. When the validity bit associated with the field group is set in the received EDI, the second circuit generates an error detection code for data in the field group and compares it to the corresponding error detection code in EDI 216. An error signal 218 is generated and signals receiver 204 when the generated error detection code does not match the corresponding error detection code in EDI 216. It is noted that EDI 216 is the same as EDI 212 unless an error occurs in the network interconnect circuit.

The grouping of the field groups may be indicated by data 220 in configuration data store 222. The configuration data store may be a set of configuration registers, for example. The first and second circuits use the configuration data to control which data fields are used to generate the error detection codes.

Figure 3:
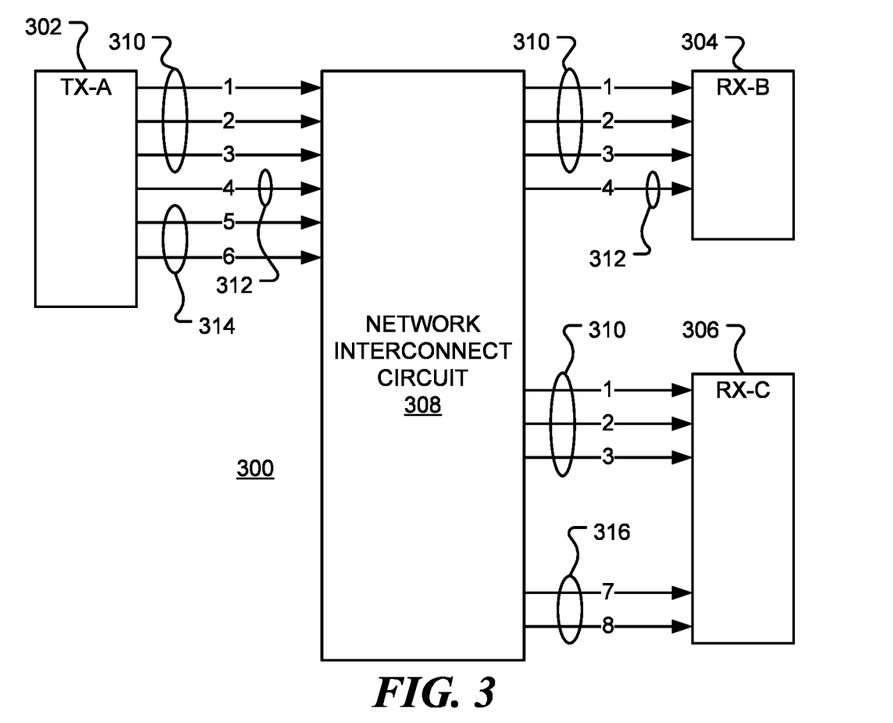
FIG. 3 is a simplified block diagram of a data processing network, in accordance with various representative embodiments.

FIG. 3 is a simplified block diagram of a data processing network 300, in accordance with various representative embodiments. In this example, transmitter (TX-A) 302 is configured to send information to first receiver 304 and second receiver 306. Transmitter 302 connects with network interconnect circuit 308 using communication protocol "A", first receiver 304 connects using communication protocol "B," and second receiver 306 connects using communication protocol "C." Protocol "A" uses six data fields, designated 1-6. Protocol "B" uses data fields 1-4. Protocol "C" uses data fields 1-3 but also uses data fields 7 and 8. In this example, if a single error detection code were used for all six fields, neither receiver would be able to detect errors since they do have access to data in all of the fields used to generate the error detection code.

In accordance with various embodiments of the disclosure, the fields are logically arranged in groups. First field group 310 includes fields 1-3. These fields are grouped because they are common to all three protocols. Second field group 312 contains only field four. This field is common to protocols "A" and "B" but is not in protocol "C". Third field group 314 contains fields 5 and 6. These fields are only used in protocol "A" but can be protected to provide increased reliability when data is sent to a receiver that connects using protocol "A". Fourth field group 316 contains fields 7 and 8. These fields are only used in protocol "C" but can be protected to provide increased reliability when data is sent from a transmitter that connects using protocol "C." In this example, four field groups are used.

Figure 4:
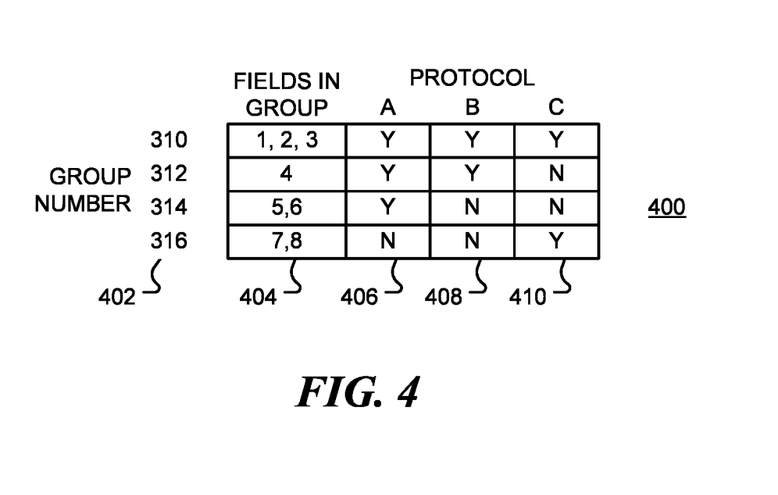
FIG. 4 depicts data in a configuration data store, in accordance with various representative embodiments.

FIG. 4 depicts data in configuration data store 400, in accordance with various representative embodiments. Column 402 indicates the group numbers shown in FIG. 3. The entries in column 404 indicate which fields are contained in the group. Column 406 indicates whether a group is included protocol "A." Column 408 indicates whether a group is included in protocol "B." Column 410 indicates whether a group is included in protocol "C." This information may be stored in various formats.

Figure 5:
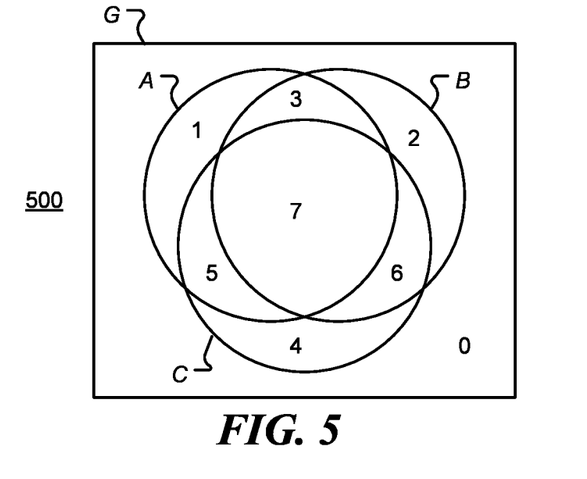
FIG. 5 is a Venn diagram depicting grouping of fields for a set of communication protocols, in accordance with various representative embodiments.

FIG. 5 is a Venn diagram 500 depicting grouping of fields for a set of communication protocols, in accordance with various representative embodiments. Set G denotes all of the fields that can be transported in the network interconnect circuit. Sets A, B and C, respectively, denote the sets of fields that are transported under protocols "A," "B" and "C." Region 0 contains those fields that are not used under any of the protocols (but may be transported in the generic transport protocol, for example). Regions 1, 2 and 4 (binary 3'b001, 3'b010, 3'b100) denote groups of fields used by a single protocol. Regions 3, 5 and 6 (binary 3'b011, 3'b101, 3'b110) denote groups of fields used by two protocols, while region 7 (binary 3'b111) denotes the group of fields used by all three protocols. As illustrated in the example in FIG. 3, some of the field groups may be empty.

Figure 6:
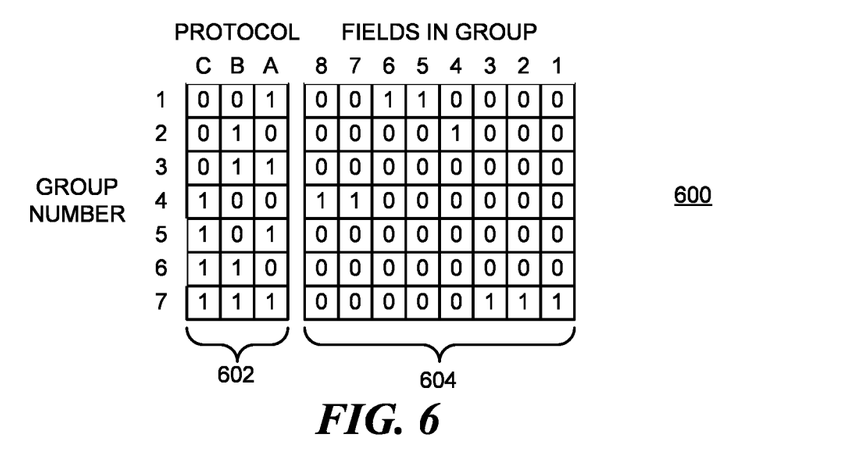
FIG. 6 depicts an example configuration table stored in a configuration data store, in accordance with various representative embodiments.

FIG. 6 depicts an example configuration table 600 stored in a configuration data store, in accordance with various representative embodiments. Entries in the data table correspond with the example shown in FIG. 3. Each row corresponds to a field group. Data block 602 stores bitmaps that indicate which protocols have access to the group (a "1" entry indicating that the protocol has access to the group, "0" indicating that it does not), while data block 604 stores bitmaps that indicate which fields are in the group. The group numbers correspond to those shown in FIG. 5. It is noted that for three protocols there are, at most, seven field groups. However, as discussed below, a group may be sub-divided if it is desired to provide finer granularity in the data protection. In practice, the protocols may contain many more than seven fields. Thus, assigning error detection codes to field groups is much more efficient than assigning an error detection code to each individual field. It is noted that when a row in data block 604 contains all zeros, storing the row in the configuration data store is optional.

Figure 7:
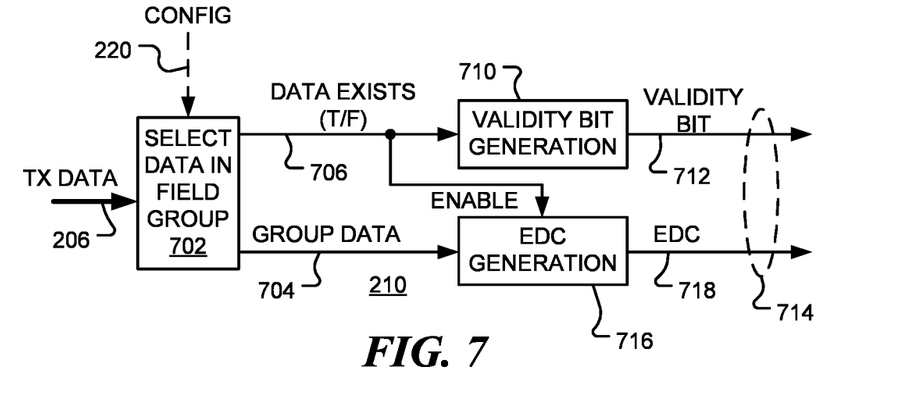
FIG. 7 is a block diagram of a circuit for generating error detection information, in accordance with various representative embodiments.

FIG. 7 is a block diagram of a circuit, 210, for generating error detection information (EDI), in accordance with various representative embodiments. Data to be transmitted 206, including data in a number of fields in a transmitter protocol, is passed to selection block 702. Based on configuration data 220, those data 704 in the fields of a field group are selected. Logic signal 706, which indicates if data in all of the fields is present in transmission data 702, is passed to validity bit generator 710 that generators validity bit 712 of error detection information (EDI) 714. Logic signal 706 is used to enable error detection code generator 716 that generates error detection code (EDC) 718 based on data 704 in the selected fields. In one embodiment, the error detection code is a parity bit. In a further embodiment, the error detection code is a checksum. In a still further embodiment, the error detection code is an error correction code. EDI 714 includes error detection code 718 and associated validity bit 712. EDI for other field groups may be generated in parallel using additional circuits, or in series using circuit 210.

Figure 8:
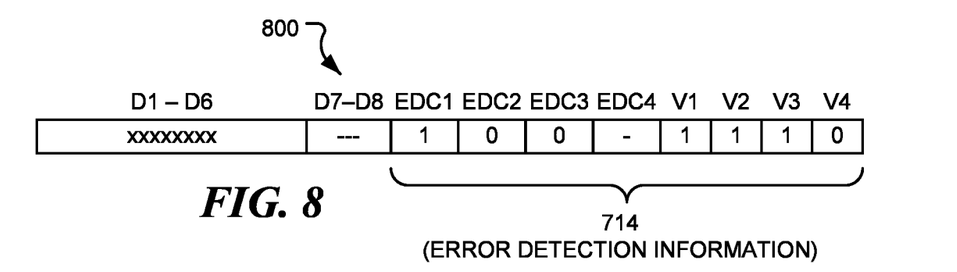
FIG. 8 is a diagrammatic representation of a data packet, in accordance with various representative embodiments.

FIG. 8 is a diagrammatic representation of a data packet 800, in accordance with various representative embodiments. Data packet 800 may be a packet of a generic transport protocol used by the network interconnect circuit. Data packet 800 includes a number of data fields, labeled D1-D8, and additional fields 714 for error detection information (EDI). EDI fields 714 include fields for four error detection codes (EDCs), labeled EDC1, EDC2, EDC3 and EDC4, and fields for four associated validity bits labeled V1, V2, V3 and V4. In the example shown, the transmitter does not have access to data in fields of field group 4 (as in the example shown in FIG. 3), so EDC4 is not set and the bit in the associated validity bit field, V4, is cleared accordingly. The other three error detection codes have been generated so the associated validity bits in fields V1, V2 and V3 are set. Data fields D1-D6 are filled, but data fields D7-D8 are not filled since the transmitter protocol did not include these fields.

Figure 9:
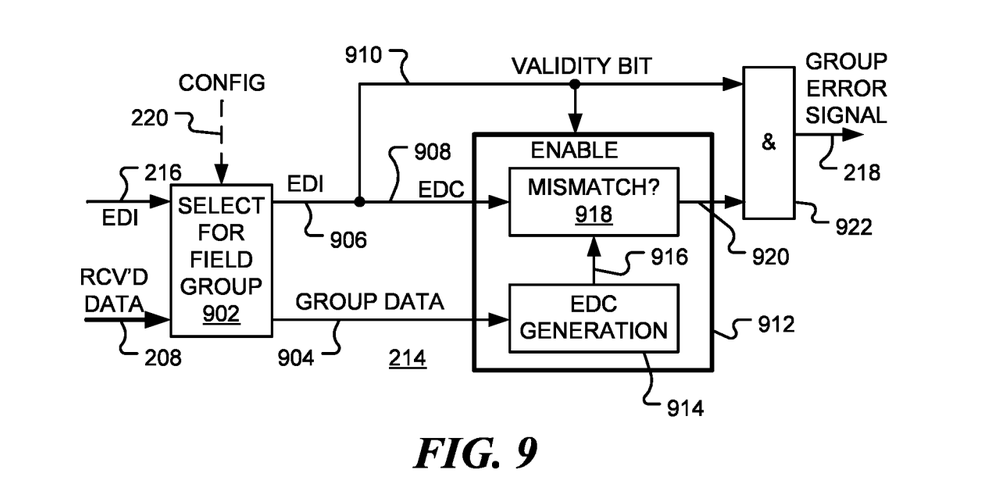
FIG. 9 is a block diagram of a circuit for checking error detection information, in accordance with various representative embodiments.

FIG. 9 is a block diagram of a circuit, 214, for checking error detection information (EDI), in accordance with various representative embodiments. Received data 208, including data in a number of fields in the receiver protocol, is passed to selection block 902. Based on configuration data 220, those data 904 in the fields of the field group are selected. In addition, EDI 906 of the field group is also selected. Selected EDI 906 includes error detection code (EDC) 908 and validity bit 910 for the first field group. Validity bit 910 may be used to enable or disable check logic 912, since no check can be performed for the field group when the received EDC for the group is not valid. Block 914 receives the data on the selected fields and generates EDC 916 for the data. The generated EDC is compared with the received EDC in comparison block 918 to produce logic signal 920 that is asserted when there is a mismatch and de-asserted when the EDC's match. Error signal 218 is asserted when an error is detected, that is, when the validity bit is set and there is a mismatch in the error detection codes. In the embodiment shown, error signal 218 is produced by logical AND gate 922.

Figure 10:
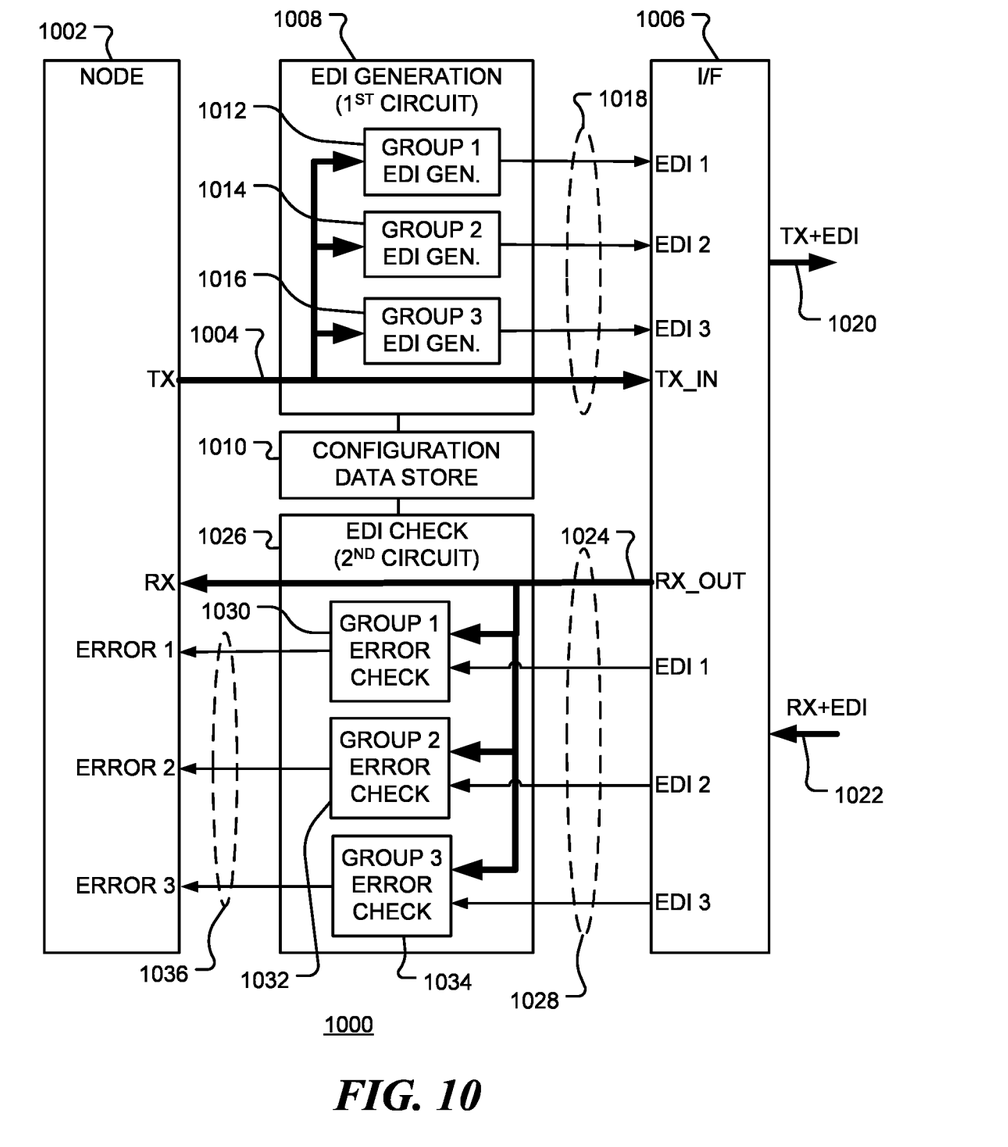
FIG. 10 is a block diagram of a link between a node and a network interface circuit, in accordance with various representative embodiments.

FIG. 10 is a block diagram of a link 1000 between a node and network interface, in accordance with various representative embodiments. Node 1002 is configured to transmit data 1004 to a network via network interface 1006 using a first communication protocol. First circuit 1008 is an EDI generation circuit that generates error detection codes and associated validity bits for data in field groups of data 1004. The field groups are specified by data in configuration data store 1010. In the example shown, there are three field groups. EDI for the groups is generated in parallel: EDI generator 1012 generates EDI for field group 1, EDI generator 1014 generates EDI for field group 2, and EDI generator 1013 generates EDI for field group 3. In an alternative embodiment, a single generator may generate EDI for each group in series. The resulting EDI and information 1004 are passed to network interface 1006 via transmit link 1018. Network interface 1006 translates the transmission information and EDI to a generic protocol and passes to the network interconnect circuit at 1020.

Similarly, information from the network, including data and associated EDI, is received in the generic protocol at 1022. Network interface 1006 translates the data from the generic protocol to the first protocol and passes the translated data 1024 and the associated EDI to second circuit 1026 via receive link 1028. Second circuit 1026 is an EDI checking circuit configured to detect errors in data 1024. EDI checker 1030 checks EDI for field group 1, EDI checker 1032 checks EDI for field group 2, and EDI checker 1034 checks EDI for field group 3. As before, the fields used in each EDI checked are selected dependent on configure data in configuration data store 1010.

Translated data 1024 and error signals 1036 are passed to node 1002.

Data processing networks are commonly designed in a modular manner from IP (intellectual property) blocks. For example, first circuit 1008 and second circuit 1026 may be individual IP blocks. Alternatively, first circuit 1008 and second circuit 1026 may be incorporated into network interface 1006 or into node 1002.

In accordance with various embodiments, a network interconnect circuit is configured to receive data via any of a number of supported communication protocols from a transmitting node and provide it, via any of the supported communication protocols. Thus, the network interconnect circuit is configured to translate between protocols. Data may be transported through the interconnect circuit in multiple fields of a generic protocol. The multiple fields include a set of field groups, where each field group in the set of field groups is common to a subset of communication protocols of the supported communication protocols. For example, a first subset of the set of field groups may be associated with at least a first communication protocol, and a second subset of the set of field groups is associated with at least a second communication protocol.

Figure 11:
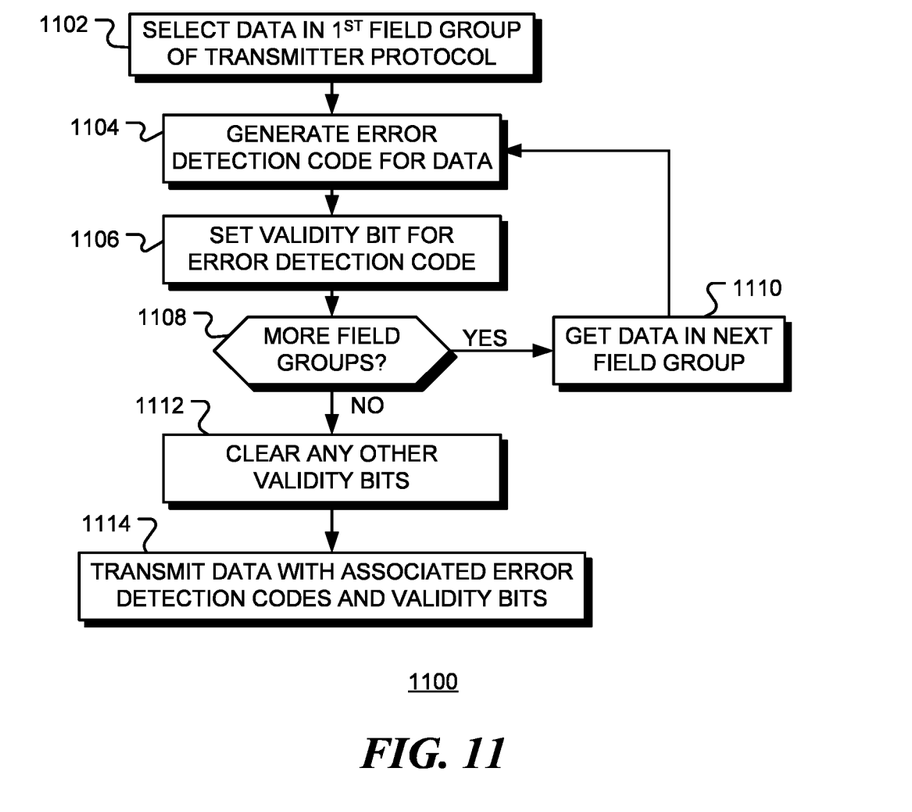
FIG. 11 is a flow chart of a method of generating error detection information for data transported through a network interconnect circuit of a data processing system, in accordance with various representative embodiments.

FIG. 11 is a flow chart of a method, 1100, of generating error detection information (EDI) for data transported through a network interconnect circuit of a data processing system, in accordance with various representative embodiments. The data are received from a transmitter via a transmitter communication protocol that uses first subset of the field groups. EDI is generated for each field group in the first subset of field groups. At block 1102, data in a first field group in the first subset are selected. At block 1104, an error detection code is generated for the data in the field group and placed in the EDI. At block 1106, a validity bit associated with the error detection code is set in the EDI. If there are more field groups to process, as depicted by the positive branch from decision block 1108, data in the next field group are selected at block 1110 and flow returns to block 1104. Otherwise, as depicted by the negative branch from decision block 1108, validity bits associated with any field groups not in the transmitter protocol are cleared in the EDI at block 1112. The data and the generated EDI are output at block 1114 and transported through the network interconnect circuit.

Figure 12:
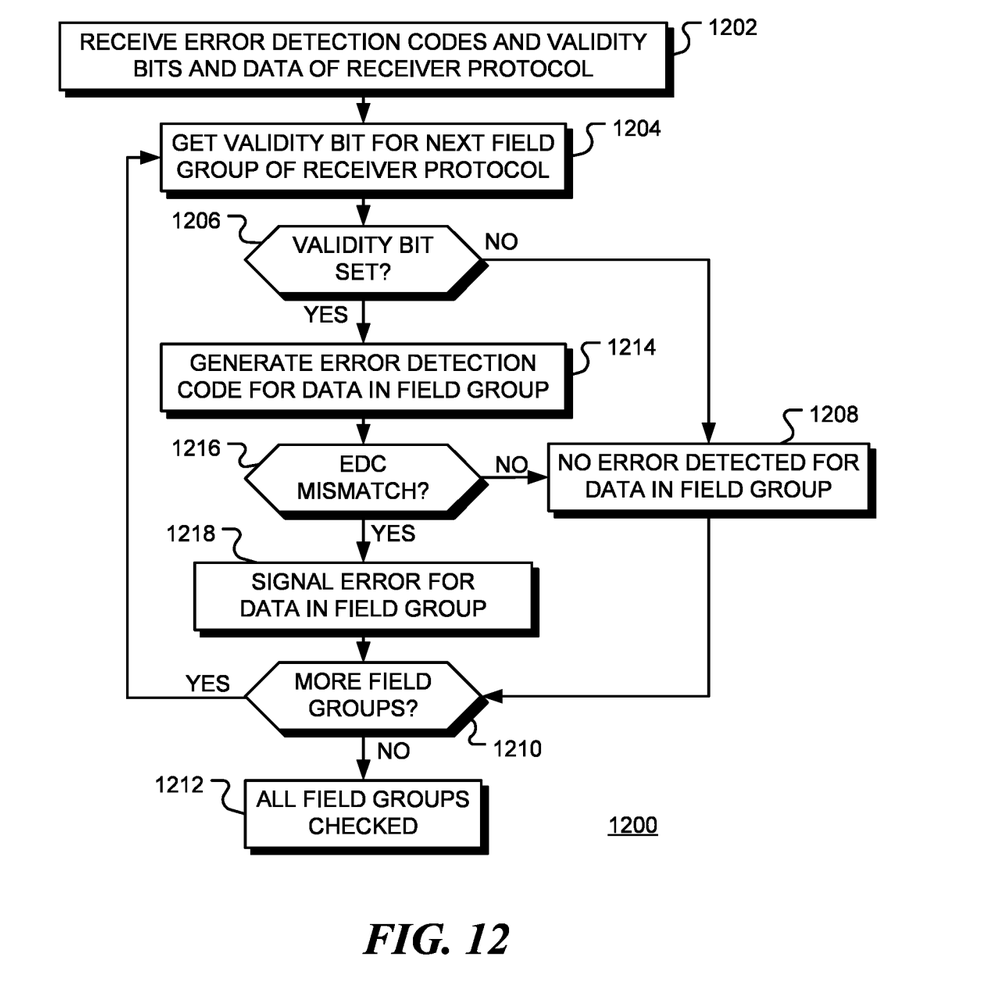
FIG. 12 is a flow chart of a method of checking error detection information for data transported through a network interconnect circuit of a data processing system, in accordance with various representative embodiments.

FIG. 12 is a flow chart of a method, 1200, of checking error detection information (EDI) for data transported through a network interconnect circuit of a data processing system, in accordance with various representative embodiments. At block 1202, data and associated EDI are received from a network interface of a network interconnect circuit. The EDI includes error detection codes and associated validity bits. The data are associated with a receiver protocol. At block 1204, a validity bit for a field group is accessed from the EDI. When the validity bit is not set, as depicted by the negative branch from decision block 1206, no error can be detected in the data of the field group, as indicated by block 1208, and flow continues to decision block 1210. When there are more field groups to check, as depicted by the positive branch from decision block 1210, flow returns to block 1204. Otherwise, as indicated by block 1210, all field groups have been checked as indicated by block 1212. When the validity bit is set, as depicted by the positive branch from decision block 1206, an error detection code is generated for data in the field group at block 1214. The generated error detection code (EDC) is compared with the error detection code of the EDI at decision block 1216. When there is no mismatch between the codes, as depicted by the negative branch from decision block 1216, no error is detected, and flow continues to block 1208. When there is a mismatch between the error codes, as depicted by the positive branch from decision block 1216, an error in the data in the field group is signaled at block 1218 and flow continues to decision block 1210.

In FIG. 11 and FIG. 12, the EDI for the groups is generated and checked in serial manner. In other embodiments, the EDI may be generated and checked for all, or some, of the groups in parallel.

TABLE 1

| | PROTOCOL | | |
|---|---|---|---|
| | AXI | AHB | APB |
| Group 0: AXI, AHB and APB | EDC = Single Parity Bit | | |
| Addr[31:12] | axaddr | HADDR | PADDR |
| User | axuser | HAUSER | PAUSER |
| Privileged | axprot[0] | HPROT[1] | PPROT[0] |
| Nonsec | axprot[1] | HNONSEC | PPROT[1] |
| Instruction | axprot[2] | ~HPROT[0] | PPROT[2] |

TABLE 1-continued

| | PROTOCOL | | |
|---|---|---|---|
| | AXI | AHB | APB |
| Group 1: AXI and AHB | EDC = Single Parity Bit | | |
| Bufferable | AXCACHE[0] && ![AXCACHE[3:1] == 3'b001] | HPROT[2] | Not checked |
| Modifiable | AXCACHE[1] | HPROT[3] | Not checked |
| Lookup | AXCACHE[2] \|\| AXCACHE[3] | HPROT[4] | Not checked |
| Allocate | For AW: AXCACHE[3] For AR: AXCACHE[2] | HPROT[5] | Not checked |
| Shareable | AXDOMAIN == 2'b01 \|\| AXDOMAIN == 2'b10 | HPROT[6] | Not checked |
| ID[3:0] | AXID | HMASTER [3:0] | Not checked |
| Group 2: AXI, AHB and APB | EDC = multi-bit ECC | | |
| Data | WDATA/RDATA | HWDATA/ HRDATA | PWDATA/ PRDATA |
| User | WUSER/RUSER | HWUSER/ HRUSER | PWUSER/ PRUSER |
| Group 3: AXI and APB | EDC = Single Parity Bit | | |
| User | BUSER | Not checked | PBUSER |

TABLE 1, above, shows an example of field groups for three on-chip communication bus protocols developed by Arm Limited as part of an Advanced Microcontroller Bus Architecture (AMBA®) standard. These protocols may be used to couple nodes to a network interconnect circuit, for example. The protocols are:

AXI: Arm® AMBA® 3 AXI interface,
AHB: Arm® ABMA® AHB interface, and
APB: Arm® ABMA® APB interface.

While the protocols share some data fields, the field may be referred to by different names, as listed in TABLE 1. There are four field groups specified in TABLE 1. Data in field groups 0, 1 and 3 are protected by an error detection code (EDC) that is a single parity bit. However, field group 2 is protected by a multi-bit error correction code (ECC). For example, a 7-bit ECC may be used for each 32-bit data unit. In this example, groups 0 and 2 could be combined, but configuring the fields as two groups allows for increased protection of the data.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "x, y or z" means "any of the following: x; y; z; x and y; x and z; y and z; x, y and z." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The embodiments described herein are combinable.

In one embodiment, a method of transporting data in a plurality of fields through a network interconnect circuit of a data processing network, including generating error detection information (EDI) for first data of a first communication protocol of a plurality of communication protocols, the EDI including an error detection code and an associated validity indicator for each field group in a set of field groups of the plurality of fields, sending the first data and the EDI to the network interconnect circuit, translating the first data to second data of a second communication protocol of the plurality of communication protocols, receiving the second data and the EDI from the network interconnect circuit and detecting an error in second data in a field group when a validity indicator for the field group is set in the EDI and an error detection code generated for second data in the field group does not match the error detection code associated with the field group in the EDI.

In another embodiment, the method where generating error detection information (EDI) for the first data includes for each field group in the set of field groups of the plurality of fields, when the field group is in the first communication protocol, generating an error detection code for first data in the field group, placing the error detection code in the EDI for the first data; and setting, in the EDI for the first data, a validity indicator associated with the error detection code, the validity indicator indicating validity of the associated error detection code for first data in the field group, and when the field group is not associated with the first communication protocol, clearing a validity indicator associated with the field group in the EDI for the first data.

In another embodiment, the method where detecting an error in second data in a field group includes for each field group in the set of field groups, when the validity indicator of the EDI is set and the second data includes data in the field group, generating an error detection code for second data in the field group, comparing the generated error detection code with the error detection code of the EDI and indicating an error in the second data in the field group when the generated error detection code does not match the error detection code of the second EDI, and when the validity indicator in the EDI is not set or the second data does not include all data in the field group not indicating an error in the data in the field group.

In a further embodiment, the method further including determining the set of field groups in the plurality of fields such that each field group in the set of field groups is common to a subset of communication protocols of the plurality of communication protocols.

In another embodiment, the method where a subset of the set of field groups is common to both the first communication protocol and the second communication protocol.

In another embodiment, the method where an error detecting code of the EDI is an error correcting code.

In a further embodiment, the method where an error detecting code of the EDI is a parity bit.

In another embodiment, the method further including selecting data in a field group in accordance with values stored in a configuration data store of the data processing network.

In another embodiment, the method further including receiving the first data from a node of the data processing network via a link in accordance with the first communication protocol.

In a further embodiment, the method further including transmitting the second data to a node of the data processing network via a link in accordance with the second communication protocol and signaling a detected error to the node.

In another embodiment, a method including identifying a set of field groups in a plurality of fields transportable through a network interconnect circuit of a data processing network, each field group in the set of field groups common to a subset of communication protocols of a plurality of communication protocols and configuring a first circuit to, for each field group, of the set of field groups, in a first communication protocol of the plurality of communication protocols, generate error detection information (EDI) for the field group, including generating an error detection code for data in the field group and setting a validity indicator associated with the error detection code and configuring a second circuit to, for each field group, of the set of field groups, in a second communication protocol of the plurality of communication protocols, determine if a validity indicator associated with data in the field group is set in the EDI and when the validity indicator is set, generate an error detection code for data in the field group, compare the generated error detection code with an error detection code associated with the data in the field group in the EDI and signal an error in the data in the field group when the generated error detection code does not match the error detection code associated with the data in the field group in the EDI.

In another embodiment, the method where the first circuit is further configured to clear, in the EDI associated with data in the first subset, a validity indicator associated with any field group of the set of field groups that is not in the first communication protocol and the second circuit is further configured to signal no error in data of a field group of the second communication protocol when the validity indicator associated with the field group is not set in the EDI associated with data in the second subset.

In a further embodiment, a data processing network including a network interconnect circuit configured to receive, at a first interface of the network interconnect circuit, first data in fields of a first communication protocol of a plurality of communication protocols, transport data in a plurality of fields from the first interface of the network interconnect circuit to a second interface of the network interconnect circuit, the plurality of fields including fields common to the first communication protocol and a second communication protocol of the plurality of communication protocols, transport error detection information (EDI) from the first interface of the network interconnect circuit to the second interface, the EDI including, for a set of field groups of the plurality of fields an error detection code for data in the field group and a validity indicator associated with the error detection code indicting whether the error detection code is valid, output second data in fields of the second communication protocol at the second interface of the network interconnect circuit. a first circuit configured to generate error detection information (EDI) for first data in field groups of the first communication protocol and a second circuit configured to detect errors in the second data using EDI for second data in field groups of the second communication protocol.

In another embodiment, the data processing network where the first circuit is configured to generate EDI by, for each field group of the set of field groups, when the field group is in the first communication protocol, generating an error detection code for first data in the field group, placing the error detection code in the EDI for the first data and setting, in the EDI for the first data, a validity indicator associated with the error detection code, the validity indicator indicating validity of the associated error detection code for data in the field group and, when the field group is not associated with the first communication protocol, clearing a validity indicator associated with the field group in the EDI for the first data.

In another embodiment, the data processing network where the second circuit is configured to detect an error in second data by, for each field group in the set of field groups when the validity indicator of the EDI is set and the second data includes data in the field group, generating an error detection code for second data in the field group, comparing the generated error detection code with the error detection code of the EDI and indicating an error in the second data in the field group when the generated error detection code does not match the error detection code of the second EDI and, when the validity indicator of the EDI is not set or the second data does not include all data in the field group not indicating an error in the data in the field group.

In a further embodiment, the data processing network where the first and second circuits are configured to generate the error detection code for data in a field group as a parity bit for the data in the field group.

In another embodiment, the data processing network further including a plurality of configuration data stores programmed to specify field groups of the set of field groups.

In another embodiment, the data processing network further including a request node either coupled to the first interface circuit via the first circuit and configured to send data transaction requests in accordance with the first communication protocol or coupled to the second interface circuit via the second circuit and configured to receive data transaction responses in accordance with the second communication protocol.

In a further embodiment, the data processing network further including a subordinate node either coupled to the first interface circuit via the first circuit and configured to send data transaction responses in accordance with the first communication protocol or coupled to the second interface circuit via the second circuit and configured to receive data transaction requests in accordance with the second communication protocol.

In another embodiment, the data processing network where a field group in the set of field groups is common to two of more communication protocols of the plurality of communication protocols.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of transporting data in a plurality of fields through a network interconnect circuit of a data processing network, comprising:
generating error detection information (EDI) for first data of a first communication protocol of a plurality of communication protocols, the EDI including an error detection code and an associated validity indicator for each field group in a set of field groups of the plurality of fields;

sending the first data and the EDI to the network interconnect circuit;

translating the first data to second data of a second communication protocol of the plurality of communication protocols;

receiving the second data and the EDI from the network interconnect circuit; and detecting an error in second data in a field group when a validity indicator for the field group is set in the EDI and an error detection code generated for second data in the field group does not match the error detection code associated with the field group in the EDI.

2. The method of claim 1, where generating error detection information (EDI) for the first data includes:

for each field group in the set of field groups of the plurality of fields:
when the field group is in the first communication protocol:
generating an error detection code for first data in the field group;
placing the error detection code in the EDI for the first data; and
setting, in the EDI for the first data, a validity indicator associated with the error detection code, the validity indicator indicating validity of the associated error detection code for first data in the field group; and
when the field group is not associated with the first communication protocol:
clearing a validity indicator associated with the field group in the EDI for the first data.

3. The method of claim 1, where detecting an error in second data in a field group includes:

for each field group in the set of field groups:
when the validity indicator of the EDI is set and the second data includes data in the field group:
generating an error detection code for second data in the field group;
comparing the generated error detection code with the error detection code of the EDI; and
indicating an error in the second data in the field group when the generated error detection code does not match the error detection code of the second EDI; and
when the validity indicator in the EDI is not set or the second data does not include all data in the field group:
not indicating an error in the data in the field group.

4. The method of claim 1, further comprising determining the set of field groups in the plurality of fields such that each field group in the set of field groups is common to a subset of communication protocols of the plurality of communication protocols.

5. The method of claim 1, where a subset of the set of field groups is common to both the first communication protocol and the second communication protocol.

6. The method of claim 1, where an error detecting code of the EDI is an error correcting code.

7. The method of claim 1, where an error detecting code of the EDI is a parity bit.

8. The method of claim 1, further comprising selecting data in a field group in accordance with values stored in a configuration data store of the data processing network.

9. The method of claim 1, further comprising receiving the first data from a node of the data processing network via a link in accordance with the first communication protocol.

10. The method of claim 1, further comprising:
transmitting the second data to a node of the data processing network via a link in accordance with the second communication protocol; and
signaling a detected error to the node.

11. A method comprising:
identifying a set of field groups in a plurality of fields transportable through a network interconnect circuit of a data processing network, each field group in the set of field groups common to a subset of communication protocols of a plurality of communication protocols, and
configuring a first circuit to:
for each field group, of the set of field groups, in a first communication protocol of the plurality of communication protocols:
generate error detection information (EDI) for the field group, including generating an error detection code for data in the field group and setting a validity indicator associated with the error detection code; and
configuring a second circuit to:
for each field group, of the set of field groups, in a second communication protocol of the plurality of communication protocols:
determine if a validity indicator associated with data in the field group is set in the EDI; and
when the validity indicator is set:
generate an error detection code for data in the field group;
compare the generated error detection code with an error detection code associated with the data in the field group in the EDI; and
signal an error in the data in the field group when the generated error detection code does not match the error detection code associated with the data in the field group in the EDI.

12. The method of claim 11, where:
the first circuit is further configured to clear, in the EDI associated with data in the first subset, a validity indicator associated with any field group of the set of field groups that is not in the first communication protocol, and
the second circuit is further configured to signal no error in data of a field group of the second communication protocol when the validity indicator associated with the field group is not set in the EDI associated with data in the second subset.

13. A data processing network comprising:
a network interconnect circuit configured to:
receive, at a first interface of the network interconnect circuit, first data in fields of a first communication protocol of a plurality of communication protocols;
transport data in a plurality of fields from the first interface of the network interconnect circuit to a second interface of the network interconnect circuit, the plurality of fields including fields common to the first communication protocol and a second communication protocol of the plurality of communication protocols;
transport error detection information (EDI) from the first interface of the network interconnect circuit to the second interface, the EDI including, for a set of field groups of the plurality of fields:

an error detection code for data in the field group; and a validity indicator associated with the error detection code indicting whether the error detection code is valid;

output second data in fields of the second communication protocol at the second interface of the network interconnect circuit;

a first circuit configured to generate error detection information (EDI) for first data in field groups of the first communication protocol; and a second circuit configured to detect errors in the second data using EDI for second data in field groups of the second communication protocol.

14. The data processing network of claim 13, where the first circuit is configured to generate EDI by, for each field group of the set of field groups:

when the field group is in the first communication protocol:

generating an error detection code for first data in the field group;

placing the error detection code in the EDI for the first data; and setting, in the EDI for the first data, a validity indicator associated with the error detection code, the validity indicator indicating validity of the associated error detection code for data in the field group; and when the field group is not associated with the first communication protocol:

clearing a validity indicator associated with the field group in the EDI for the first data.

15. The data processing network of claim 13, where the second circuit is configured to detect an error in second data by, for each field group in the set of field groups:

when the validity indicator of the EDI is set and the second data includes data in the field group:

generating an error detection code for second data in the field group;

comparing the generated error detection code with the error detection code of the EDI; and indicating an error in the second data in the field group when the generated error detection code does not match the error detection code of the second EDI; and when the validity indicator of the EDI is not set or the second data does not include all data in the field group:

not indicating an error in the data in the field group.

16. The data processing network of claim 13, where the first and second circuits are configured to generate the error detection code for data in a field group as a parity bit for the data in the field group.

17. The data processing network of claim 13, further comprising a plurality of configuration data stores programmed to specify field groups of the set of field groups.

18. The data processing network of claim 13, further comprising a request node either:

coupled to the first interface circuit via the first circuit and configured to send data transaction requests in accordance with the first communication protocol; or coupled to the second interface circuit via the second circuit and configured to receive data transaction responses in accordance with the second communication protocol.

19. The data processing network of claim 13, further comprising a subordinate node either:

coupled to the first interface circuit via the first circuit and configured to send data transaction responses in accordance with the first communication protocol; or coupled to the second interface circuit via the second circuit and configured to receive data transaction requests in accordance with the second communication protocol.

20. The data processing network of claim 13, where a field group in the set of field groups is common to two of more communication protocols of the plurality of communication protocols.

* * * * *